United States Patent [19]
Johnson, Jr.

[11] 4,078,749
[45] Mar. 14, 1978

[54] HELICOPTER STICK FORCE AUGMENTATION NULL OFFSET COMPENSATION

[75] Inventor: Raymond G. Johnson, Jr., Milford, Conn.

[73] Assignee: United Technologies Corporation, Hartford, Conn.

[21] Appl. No.: 800,117

[22] Filed: May 24, 1977

[51] Int. Cl.² ............................................. G05D 1/10
[52] U.S. Cl. .................................... 244/178; 91/433; 244/17.13
[58] Field of Search ................. 91/433; 244/17.13, 78, 244/84, 85, 178, 181, 182, 194, 223, 226–228; 318/564, 565; 416/31, 35–37, 42

[56] References Cited

U.S. PATENT DOCUMENTS

| | | | |
|---|---|---|---|
| 3,426,650 | 2/1969 | Jenney | 244/78 X |
| 3,604,664 | 9/1971 | Mahoney | 244/84 |
| 3,727,520 | 4/1973 | McKown et al. | 91/433 |
| 3,733,039 | 5/1973 | O'Connor et al. | 244/17.13 X |
| 3,920,966 | 11/1975 | Knemeyer et al. | 244/182 X |

Primary Examiner—Stephen G. Kunin
Attorney, Agent, or Firm—M. P. Williams

[57] ABSTRACT

In the cyclic pitch stick controls of a helicopter of the type in which feel is provided to the pilot by inducing a force which is proportional but opposite to the motion of the cyclic stick from an adjustable trim position, null offset errors which may be due, inter alia, to temperature variation of the hydraulic fluid in the system, are periodically overcome by means of sensing the pressure differential across the force augmentation hydraulic servo actuator at times when the differential pressure thereacross should be nearly zero, during trim release with small stick motion, and providing a countermanding bias in response thereto; the pressure differential is measured by a differential pressure transducer having a full scale which is only sufficient to measure the expected null errors, which may be about an order of magnitude lower than the full scale, operative pressure differentials which may occur.

3 Claims, 1 Drawing Figure

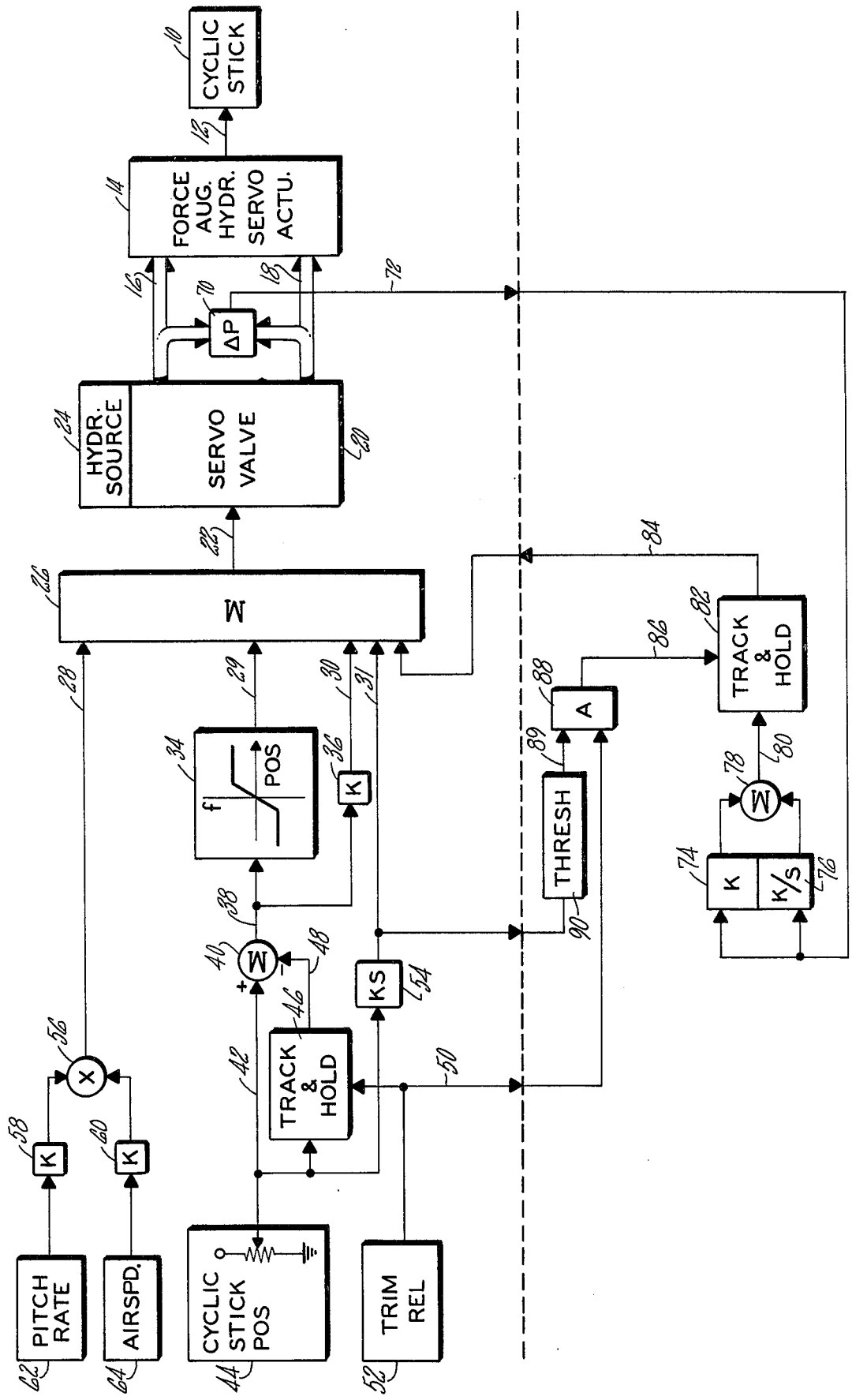

HELICOPTER STICK FORCE AUGMENTATION NULL OFFSET COMPENSATION

The invention disclosed herein was made under or in the course of a contract with the Department of the Army.

FIELD OF ART

This invention relates to helicopter control stick force augmentation, more particularly, to null offset compensation utilizing low range, low accuracy components.

BACKGROUND OF THE INVENTION

It has long been known that safe and competent maneuvering of complex aircraft, such as helicopters, is enhanced by provision of pilot feel in the control sticks. For instance, it is known in helicopters to induce feel into the longitudinal cyclic pitch control stick (referred to hereinafter as "cyclic stick"), by introducing a force which is opposite to the motion of the stick from a null or trim position, so that the pilot can "feel" the significance of a command which his motion of the stick is inducing. It is also known that the null position may be moved from time to time by "trim" controls, so that when the helicopter is flying in steady state conditions, the cyclic stick will stay in a desired position (both longitudinally and laterally) without the pilot having to retain hold of the stick. When flight conditions change, and the null or trim position is desired to be changed, the pilot can press a trim release button on the top of the stick, reposition the stick until desired attitude of the craft and its rotor surfaces have been attained, and reengage the trim control by disengaging the trim release button. The stick will thereafter retain the new, desired trim position until the trim release is subsequently depressed.

The force augmentation, including the elimination of force at the trim position, is effected in most cases by hydraulic servo actuators, the mechanical output of which is effective in either the forwardd or the reverse direction of stick motion directly on the mechanical linkage associated with the cyclic stick. Thus, as the stick is moved from the trim position, the hydraulic actuator creates a force against that motion to provide a proportional feel of the stick motion to the pilot. The hydraulic servo actuator is controlled by an electrohydraulic servo valve which has two outputs, one relating to each of the directions of motion of the hydraulic servo actuator, each output having a hydraulic pressure which is a function of the magnitude of an input electrical signal, the polarity of the input signal determining the polarity of the differential pressure output from the servo valve. Electro/hydraulic force augmentation systems of this general type are illustrated in commonly owned U.S. Pat. Nos. 3,733,039 and 3,719,336.

One problem with this type of system is that a true null position (zero force for zero electrical signal input to the servo valve) is hard to maintain for long time periods over wide variations of temperature of the hydraulic fluid utilized in the servo valve and the hydraulic servo actuator. In fact, temperature variations can equal or exceed the desired control functions to be provided by such devices. When the null shifts as a result of variations in valve or actuator operation due to temperature, the trim position will readjust automatically to compensate, and the stick will acquire a nonlinear feel which is disruptive to proper maneuvering of the craft. Also, the force required to overcome friction in the force augmentation system will vary with drift, causing variation in the stick response to automatic positioning means (such as an autopilot).

Suggestions for overcoming the drift problem may include one-time manual readjustment of gains and/or biases at some point in the system, which can only partially compensate most of the time and will compensate perfectly only on a random, infrequent basis. A full range differential pressure sensor across the output of the servo valve may provide a signal for comparison with the electric demand signal at the input to the servo valve, such that being closed loop, any null offset errors would be compensated for by the feedback. But, closed loop operation naturally requires a pressure range at least equal to the operative differential pressure which may be provided at the hydraulic servo actuator input; and the accuracy (as a percent of full scale) may provide feedback with errors greater than the errors desired to be overcome, unless the pressure sensor and other components are extremely accurate and therefore expensive.

SUMMARY OF THE INVENTION

Objects of the present invention include provision of simplified stick force augmentation null offset compensation in a helicopter and stick force augmentation null offset compensation utilizing components which have no particular requirement for accuracy.

According to the present invention, the differential pressure across the input to a force augmentation hydraulic servo actuator, measured when the trim release is depressed and stick motion is relatively low, provides a bias input to the force augmentation system to compensate for null offset errors. In accordance further with the invention, a differential pressure sensor, having a full scale range which is significantly lower than the range of operative differential pressures which might be applied to the input of the hydraulic servo actuator, is utilized only at times when the differential pressure inputs are correspondingly small. In still further accord with the present invention, the use of a differential pressure sensor having a range which is fractional with respect to the total differential pressures applied to the hydraulic servo actuator permits use of such a pressure sensor without any inordinate accuracy requirements, since the accuracy is correspondingly fractional in its effect.

The present invention, by limiting operation to periods when trim release has been depressed and stick motion is small, permits use of simplified, relatively low-accuracy components to provide force augmentation null offset compensation in helicopter control sticks. The invention is readily implemented utilizing technology which is known in the art, and may be easily adapted to existing systems as well as implemented in a variety of forms in dependence upon the particular utilization to be made thereof.

The foregoing and other objects, features and advantages of the present invention will become more apparent in the light of the following detailed description of exemplary embodiments thereof, as illustrated in the accompanying drawing.

DESCRIPTION OF THE DRAWING

The sole FIGURE herein comprises a schematic block diagram of an exemplary embodiment of force augmentation null offset compensation in accordance with the present invention, illustrative of the functional precepts of the present invention.

DETAILED DESCRIPTION

Referring now to the drawing, the cyclic stick 10 is mechanically connected (12) to the mechanical output of a force augmentation hydraulic servo actuator 14, which is of a well known type and provides a force to the cyclic stick 10 in either the forward or reverse direction in dependence upon the direction and magnitude of differential pressure of hydraulic fluid applied by hydraulic lines 16, 18 from an electric/hydraulic servo valve 20. The servo valve 20 may be of any well known type which is capable of responding to the magnitude and polarity of an input signal on a line 22 so as to direct hydraulic fluid under pressure from a source 24 in a corresponding fashion to provide differential pressure of corresponding polarity and magnitude to the hydraulic lines 16, 18 at its output. Such a servo valve may consist of a flapper valve positioned by directionally-responsive magnetic coils to alter the back pressure feeding a piston, the position of which directs the fluid from the source 24 to the output hydraulic lines 16, 18; or the servo valve may be of any other type having the intended function. One suitable servo valve known in the art is available as Model 22 232 500 from Hydraulic Research and Manufacturing Co., Valencia, Cal.

The signal on the line 22 is illustrated as being developed by a single summing network 26 in response to a plurality of signal lines 28–31 which provide signals indicative of various helicopter functions. The summing network 26 generates a desired force augmentation signal on the line 22 which has a polarity to develop a force opposite to stick motion, and an amplitude related to stick motion and helicopter maneuvering factors, as described hereinafter.

The principal force augmentation command is provided on the signal line 29 by a function generator 34 in combination with the signal on the line 30 provided by an amplifier 36. The combination of these two signals are equivalent to commanding an augmenting force as a function of cyclic stick position which is opposite to the direction of the stick from a neutral position (as defined hereinafter), with a detent type of feel at the neutral position; this is provided by adding additional force to a linear function of stick position, the additional force being one which advances from zero to a constant small value, by the function generator 34. Instead of using both the function generator 34 (which has a flat characteristic above a certain position of the stick in either direction), the function generator 34 could be used alone (eliminating the amplifier 36), provided that, instead of a flat characteristic throughout most of its range (as illustrated in the function generator 34 herein), it would have an increasing characteristic throughout its range, though increasing at a somewhat lesser rate than the steep-slope area around zero. In any event, the total signal provided as a function of cyclic stick position has a more rapid initial increase, and then a lesser increase as a function of position, to provide a detent feel at a neutral position. The signal input to the function generator 34 and amplifier 36 is provided on a line 38 from a summing junction 40, which may either be associated with or comprise the inputs of an amplifier, as is known in the art. One input on a line 42 is provided directly as a function of cyclic stick position from a sensor 44, which may typically comprise a potentiometer which mechanically tracks the cyclic stick position in a fashion which is well known in the art. The signal on the line 42 may be provided to a track and hold circuit 46 (sometimes referred to as a sample and hold circuit) to provide a signal on a line 48 which follows the signal on the line 42 whenever a track or sample signal is provided on a line 50; but when the signal is not present on the line 50, the signal on the line 48 will remain at the same amplitude which the input signal on the line 42 held at the moment when the signal on the line 50 disappeared. The signal on the line 50 is developed by a trim release switch 52 which is associated with the cyclic stick 10. It is this switch which the pilot depresses when he wishes to adjust the netural or trim position of the stick (the position which the stick will maintain with hands off). And, it is the track and hold circuit 46 which provides the trim position, since the summing junction 40 will provide zero output on the line 38 so long as the cyclic stick position is the same as it was when the trim release switch 52 was disengaged, thereby establishing the value of the signal on the line 48. It is only motion of the stick away from the position which it held when the track and hold circuit 46 was placed into its hold mode that will cause a differential signal output of the summing junction 40, and in turn create signals to generate an augmenting force.

A second input to the summing junction 26 is a signal on the line 31 from a differentiating circuit 54, the output of which is a function of the rate of change of stick position, or the speed at which the stick is being moved. This is provided so that the augmenting force will be increased if the pilot is moving the stick rapidly, thereby to tend to limit the rate at which the stick will be moved, and to warn the pilot if he is moving it at an excessive rate.

Another input to the summing junction 26 on the signal line 28 is from a multiplier circuit 56, which provides the product of the output of two amplifiers 58, 60 which are respectively responsive to a pitch rate gyro 62 and an airspeed sensor 64. The signal on the line 28 is proportional to centrifugal force loading of the helicopter rotor as a consequence of undergoing a change in pitch attitude at a given airspeed, since the centrifugal force is equal to the product of the square of the angular rate and the radius, but the airspeed is approximately equal to the product of the angular rate and the radius, such that the product of airspeed and pitch rate is approximately equal to the product of the radius and the square of the angular rate (and therefore approximately equal to rotor loading by the centrifugal force due to longitudinal cyclic pitch). Thus, stick force augmentation due to pitch rates (either from maneuvering or wind gusts) is increased at high speed, in order to stabilize flight and to provide an indication of loading of the rotor to the pilot, so that the pilot may avoid breaching the structural envelope of the helicopter from excessive maneuvers.

The force augmentation system described with respect to the drawing thus far is conventional, and forms no part of the present invention. The invention herein is in providing for null compensation by determining any pressure differential which may eixst at a time when the output of the servo valve 20 should be nearly zero, and therefore any output is an indication of the system null being erroneously offset, such as a consequence of temperature differentials in the hydraulic system.

The pressure differential between the hydraulic lines 16, 18 is continuously sensed by a differential pressure sensor 70, which provides a pressure signal, indicative of the differential pressure, on a line 72 at all times. In accordance with one aspect of the invention, because of the nature of the overall system of the invention, the differential pressure sensor 70 need only have a limited range, which may be about an order of magnitude lower than the pressure differential which may exist between the hydraulic lines 16, 18 when maximum force augmentation is being provided by the system. Therefore, the pressure signal on the line 72 may increase up to some maximum, and remain constant during stick motion, thereafter; however, the pressure signal is not utilized when it is representative of the maximum output of the differential pressure sensor 70, so this in immaterial.

The pressure signal on the line 72 is provided to a bias means including the proportional gain of an amplifier 74 and the integral gain of an integrating amplifier 76, all as is well known in the art. The outputs of the amplifiers 74 and 76 are combined in a suitable summing junction 78, which, as is known, may comprise the input summing resistors of a suitable amplifier. The output of the summing junction 78 is provided on a line 80 to the input of a track and hold circuit 82, the output of which is a bias signal provided on a line 84 to the summing junction 26. The bias signal on the line 84 comprises a null offset compensation bias input to the servo valve 20 of the force augmentation system which has been described hereinbefore. The track and hold circuit 82 is caused to track the input signal on the line 80 in response to a track signal on a line 86 which is provided by an AND circuit 88 whenever the trim release has been depressed, as indicated by the signal on the line 50, and the rate of stick position is low as indicated by a low motion signal on a line 89 from a threshold detector 90, which is responsive to the stick position rate signal on the line 31. Thus, the AND circuit 88 will allow the bias signal on the line 84 to be changed only when trim release has been depressed and stick motion has been reduced to a low value. The threshold detector 90 may comprise a suitable voltage compare circuit of any type known in the art. Because the track and hold circuit 82 is responsive to the signal on the line 86, which can only appear when the trim release switch 52 is pressed, and when the differentiator 54 indicates a suitably low motion of the cyclic stick, the track and hold circuit 82 can be responsive to the proportional/integral output of the differential pressure sensor 70 only when the pressure difference between the hydraulic lines 16 and 18 should be nearly zero, and therefore principally dependent on the amount of drift in the hydraulic system (such as due to temperature variations and the like). And, because the pilot will normally adjust his flight conditions, and therefore press the trim release periodically as a consequence of normal flight, the track and hold circuit 82 can be automatically updated from time to time, at a rate which is sufficient so as to provide adequate compensation for offset of the null during flight.

The embodiment described thus far is essentially analog in nature; however, the best mode of practicing the invention may be digital in nature, in dependence upon the environment in which the invention is to be utilized. For instance, in a helicopter having an automatic pilot implemented by means of a digital computer, some of the processing power of the computer may be utilized by suitable programming to implement the present invention in a digital fashion. In such a case, an analog to digital converter may be provided to convert the signals provided by the sensor into digital form, or in some implementations, the sensors may themselves be digital in nature; for instance, well known digital shaft angle encoders may be utilized for sensing stick position; and, frequencydependent, digital pressure transducers may be utilized. In any event, the actual force augmentation portion may be digitally implemented in any desirable fashion, with an updating rate of approximately forty times per second. The digital implementation is well suited to providing the track and hold function by means of registers, the input to which can be changed periodically, the output of which otherwise remains static until changed. And, the summation and multiplication functions are also well known in digital computation. The function generator 34 may, as is well known in the art, be supplanted by a table lookup device such as a read only memory, or by table lookup combined with arithmetic interpolation, all as is well known in the art.

With respect to the null offset error compensation of the present invention (which is confined to the bottom of the drawing herein), the differential pressure (such as indicated by the signal on the line 72) need be sampled periodically on a real time basis in order to provide integral gain (equivalent to the function of the integrating amplifier 76), utilizing any known digital integration technique, and the remaining functions may be called into play simply by the discrete sensing of the fact that the trim release switch 52 has been depressed and the rate of stick motion is below a threshold amount. The updating of the integral gain of the differential pressure may be done on the order of ten times per second, for instance. This can be achieved in a wide variety of fashions, the details of which will necessarily be highly dependent upon the particular digital apparatus available (such as a navigational computer, a fuel control computer, or an automatic pilot computer), but the manner of implementing the present invention in any given digital embodiment is well within the skill of the art in view of the teachings herein. On the other hand, since detailed accuracy is not required, the functions may be performed in an analog fashion, if desired, with A/D and D/A conversion around registers for holding the desired trim and in the inventive portion herein, the last known required null offset compensation bias (equivalent to the track and hold circuit 82). The implementation of the invention is capable of assuming a wide variety of forms in dependence upon the environment in which it is to be used, all within the skill of the art. Similarly, although the invention has been shown and described with respect to exemplary embodiments thereof, it should be understood by those skilled in the art that the foregoing and various other changes, omissions and additions may be made therein and thereto, without departing from the spirit and the scope of the invention.

CLAIMS

Having thus described typical embodiments of my invention, that which I claim as new and desire to secure by Letters Patent of the United States is:

1. In a helicopter force augmentation system in which differential hydraulic pressure is provided to a force augmenting hydraulic servo actuator to provide force to a cyclic control stick in the helicopter, said cyclic control stick being associated with a trim release switch, said differential hydraulic pressure being provided by an electro/hydraulic servo valve in response to electric signals indicative of positioning of the cyclic control stick, the improvement comprising:

pressure means for sensing the magnitude and polarity of differential pressure input provided by said servo valve to said force augmentation hydraulic servo actuator and providing a pressure signal indicative thereof;

means for sensing the rate of motion of the cyclic stick and providing a low motion signal indicative of the rate of motion being less than a threshold rate;

means responsive to said trim release switch to provide a trim release signal indicating that stick trim control has been released;

means responsive to concurrent presence of said low motion signal and said trim release signal to provide a track signal; and bias means responsive to said pressure signal and to said track signal to provide a null offset compensation bias signal input to said servo valve in response to the value of said pressure signal during the presence of said track signal and, in the absence of said track signal, in response to the last value of said pressure signal at the time of disappearance of said track signal.

2. The improvement according to claim 1 wherein said pressure means has a full scale pressure range which is significantly lower than the range of operative differential hydraulic pressure provided by said servo valve to said hydraulic servo actuator.

3. The improvement according to claim 1 wherein said bias means includes means to provide said bias signal in response to proportional and integral functions of said pressure signal.

* * * * *